June 16, 1942.     E. SWANSON     2,286,939
RAKE
Filed Dec. 21, 1939
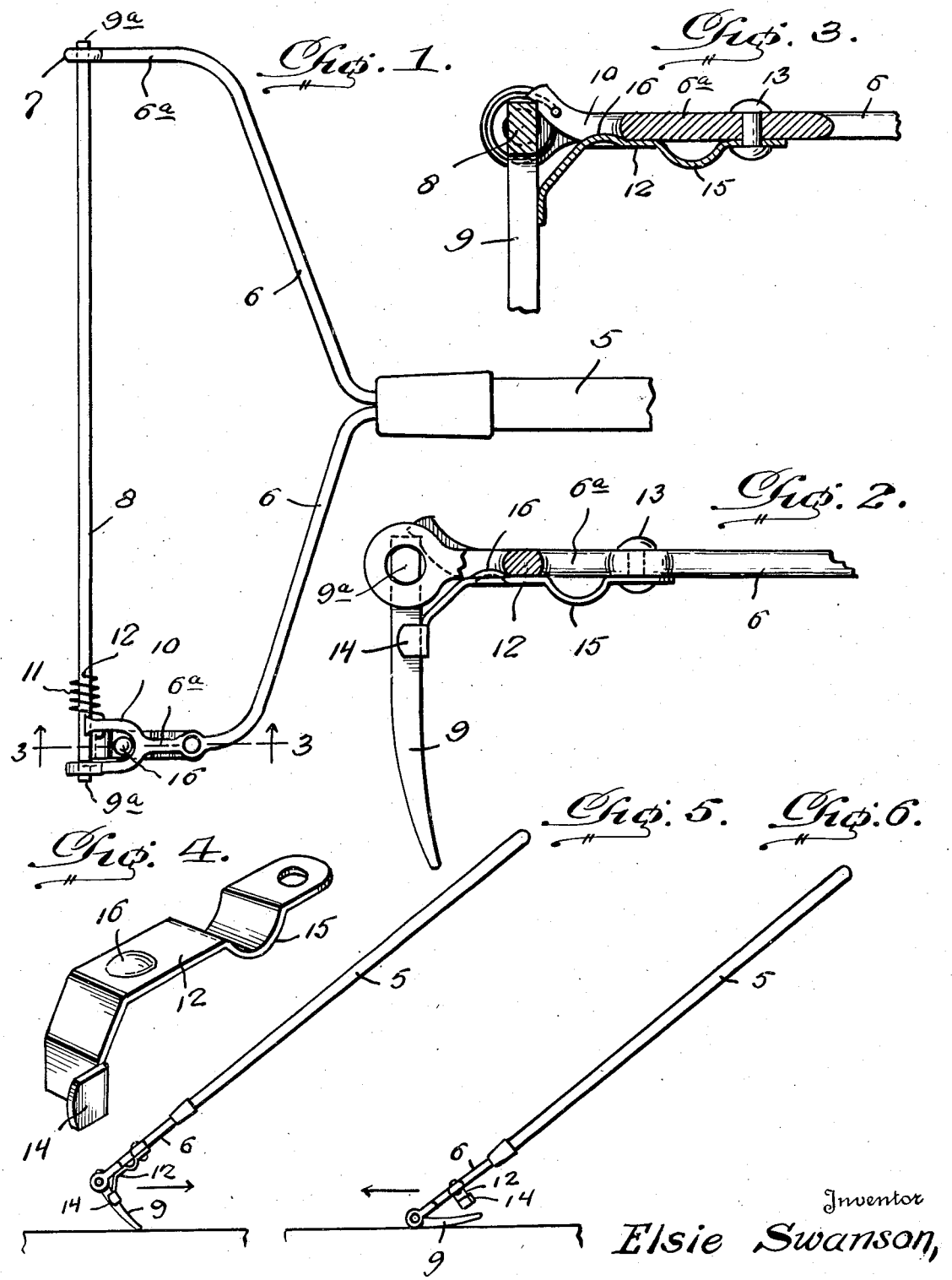
Inventor
Elsie Swanson,
By Stanley Burch
Attorney Patented June 16, 1942

2,286,939

UNITED STATES PATENT OFFICE 2,286,939

RAKE

Elsie Swanson, Seattle, Wash.

Application December 21, 1939, Serial No. 310,425

3 Claims. (Cl. 56—400.20)

This invention relates to an improved lawn and garden rake of the type embodying a hinged rake head normally yieldingly held in a forwardly swung operative position substantially at right angles to the rake handle but free to swing rearwardly upon forward movement of the rake so as to automatically clean leaves and trash from the teeth of the rake head when used to rake a lawn or the like.

The primary object of the present invention is to provide an efficient rake of the above type, and one which is extremely simple and durable in construction, economical to manufacture, and otherwise well adapted for successful commercial use.

The present invention also contemplates the provision of means to secure the rake head in its forwardly swung operative position and against rearward swinging movement for use as an ordinary rigid rake when cleaning of the teeth is not necessary, such as when using the rake for gardening purposes.

With the above and other objects in view, the present invention consists in the novel form, combination and arrangement of parts hereinafter more fully described, shown in the accompanying drawing and claimed.

In the drawing:

Figure 1 is a top plan view of a rake constructed in accordance with the present invention, the handle of the rake being broken away.

Figure 2 is a fragmentary view partly in side elevation and partly in section, of the rake shown in Figure 1.

Figure 3 is an enlarged vertical section on line 3—3 of Figure 1.

Figure 4 is an enlarged perspective view of the fastener for securing the rake head against swinging movement.

Figure 5 illustrates the rake in use for gardening purposes with the rake head held against swinging movement; and Figure 6 is a similar view illustrating the rake head released for yielding to effect automatic cleaning of the rake teeth when the rake is used to rake lawns or the like.

Referring in detail to the drawing, the present rake includes a handle 5 having a widely bifurcated shank at one end whose legs 6 diverge forwardly and have substantially parallel forward end portions 6a terminating at their free forward ends in bearings 7.

The rake further includes a rake head comprising an elongated bar 8 provided with spaced depending rake teeth 9 and having the ends thereof reduced and rounded to provide journals 9a rotatably fitted in the bearings 7. The rake head is thus hinged for swinging movement about a horizontal axis in the arms of the shank, and extending laterally inwardly and then forwardly from one of the end portions 6a of one of the shank arms 6 is a lug 10 arranged to engage the bar 8 of the rake head at its upper edge as shown in Figure 3, so as to limit the forward swinging movement of the rake head to a position wherein said rake head is disposed substantially at right angles to the handle 5. The rake head is yieldingly urged to this normal forwardly swung position by means of a helical torsion spring 11 encircling the bar 8 near one end thereof and having its inner end attached to said bar 8 as at 12, the outer end of spring 11 being attached to the lug 10.

From the above description, it will be seen that upon rearward movement of the rake, the latter will act to effectively gather leaves and trash, but upon forward movement of the rake and downward pressure thereon as illustrated in Figure 6, the rake head will yield or swing rearwardly so as to occupy a position substantially parallel with the ground. In this way any leaves or trash caught in the teeth of the rake head will be effectively stripped therefrom as the rake is used.

In some cases, there will be no need of permitting yielding of the rake head to provide for cleaning the teeth thereof, such as when the rake is used for gardening purposes. I accordingly provide means to releasably secure the rake head against rearward swinging movement and in its normal forwardly swung or operative position as shown in Figures 1 to 3 inclusive and 5. As shown, this fastening means includes a swinging fastener 12 comprising an elongated strip of metal pivoted at 13 by one of its ends to the underside of the end portion 6a provided with the stop lug pin, so that the fastener 12 may swing laterally to a forwardly extending position engaging behind an end tooth of the rake head. The fastener 12 has a down turned free end portion arranged to abut this end tooth when the fastener is swung forwardly and inwardly, and such down turned free end portion of the fastener 12 has a side lug 14 projecting forwardly therefrom so as to engage the outer side of this end tooth of the rake head and thereby limit the swinging movement of the fastener 12 to a position wherein its down turned forward end properly abuts the rear side of such end tooth. Fastener 12 is preferably formed of spring metal and provided with a downwardly offset intermediate portion 15 so that the fastener will be of a yieldable nature. Also, near its down turned forward end portion, the fastener 12 is provided with an upwardly pressed bead 16 arranged to snap past the end portion 6 of the adjacent shank arm 6 so that the fastener will be effectively held in fastening position. Thus, the fastener 12 may not be readily accidentally released, although it may be readily intentionally released by manual force. When the fastener 12 is operatively positioned as shown in Figures 1 to 3 inclusive, and 5, the rake head will be effectively held in its forwardly swung position and the rake may then be used the same as an ordinary rigid rake, as will be apparent. The terms "forward" and "rearward," as used herein, respectively refer to directions away from and toward the operator.

From the foregoing description, it will be seen that I have provided a rake of the type described which is extremely simple and durable in construction, efficient in use, and economical to manufacture. The rake comprises a minimum number of simple and durable parts so that it may not readily get out of order, and it is convenient to quickly release the rake head or rigidly fasten it against yielding. Minor changes in the details of construction illustrated and described are contemplated such as fairly fall within the scope of the invention as claimed.

What I claim as new is:

1. A rake of the character described including a rake head consisting of a bar provided with end journals and having depending rake teeth, a handle having a shank composed of forwardly diverging arms provided at their forward ends with bearings in which the journals of the rake head are rotatably engaged, a stop lug extending laterally inwardly and then forwardly from a forward end portion of one of the shank arms and arranged to abut said bar of the rake head to limit forward swinging movement of the rake head to a position substantially at right angles to the handle, a spring yieldingly urging the rake head to such forwardly swung position, and means to releasably secure the rake head in such forwardly swung position, said last-named means comprising a laterally swinging fastener hinged at one end to a forward end portion of said one shank arm and having a down turned free end portion arranged to abut an end tooth of the rake head when swung forwardly and laterally inwardly.

2. A rake of the character described including a rake head consisting of a bar provided with end journals and having depending rake teeth, a handle having a shank composed of forwardly diverging arms provided at their forward ends with bearings in which the journals of the rake head are rotatably engaged, a stop lug extending laterally inwardly and then forwardly from a forward end portion of one of the shank arms and arranged to abut said bar of the rake head to limit forward swinging movement of the rake head to a position substantially at right angles to the handle, a spring yieldingly urging the rake head to such forwardly swung position, means to releasably secure the rake head in such forwardly swung position, said last-named means comprising a laterally swinging fastener hinged at one end to a forward end portion of said one shank arm and having a down turned free end portion arranged to abut an end tooth of the rake head when swung forwardly and laterally inwardly, and a stop lug on the down turned end of the fastener projecting forwardly to abut the outer side of said end tooth and limit the forward and inward swinging movement of the fastener.

3. A rake of the character described including a rake head consisting of a bar provided with end journals and having depending rake teeth, a handle having a shank composed of forwardly diverging arms provided at their forward ends with bearings in which the journals of the rake head are rotatably engaged, a stop lug extending laterally inwardly and then forwardly from a forward end portion of one of the shank arms and arranged to abut said bar of the rake head to limit forward swinging movement of the rake head to a position substantially at right angles to the handle, a spring yieldingly urging the rake head to such forwardly swung position, and means to releasably secure the rake head in such forwardly swung position, said last-named means comprising a laterally swinging fastener hinged at one end to a forward end portion of said one shank arm and having a down turned free end portion arranged to abut an end tooth of the rake head when swung forwardly and laterally inwardly, said fastener being resilient and having an upwardly pressed bead arranged to snap past the forward end portion of the adjacent shank arm to prevent accidental release of the fastener.

ELSIE SWANSON.